US012625909B2

(12) United States Patent
Wiggins

(10) Patent No.: US 12,625,909 B2
(45) Date of Patent: May 12, 2026

(54) ENABLING OR BLOCKING PROCESSING OF QUERIES TO AN ARTIFICIAL INTELLIGENCE SYSTEM BASED ON INTENTS OF THE QUERIES

(71) Applicant: OneTrust LLC, Atlanta, GA (US)

(72) Inventor: Shane Wiggins, Atlanta, GA (US)

(73) Assignee: OneTrust LLC, Atlanta, GA (US)

( * ) Notice: Subject to any disclaimer, the term of this patent is extended or adjusted under 35 U.S.C. 154(b) by 95 days.

(21) Appl. No.: 18/667,854

(22) Filed: May 17, 2024

(65) Prior Publication Data

US 2025/0355947 A1     Nov. 20, 2025

(51) Int. Cl.
*G06F 16/903* (2019.01)
(52) U.S. Cl.
CPC .............................. *G06F 16/90335* (2019.01)
(58) Field of Classification Search
None
See application file for complete search history.

(56) References Cited

U.S. PATENT DOCUMENTS

| | | | | |
|---|---|---|---|---|
| 11,743,298 B1 * | 8/2023 | Badana | ................. | H04L 63/104 |
| | | | | 726/1 |
| 2024/0086489 A1 * | 3/2024 | Sachindran | ......... | G06F 16/9574 |
| 2025/0068741 A1 * | 2/2025 | Lafon | ................... | G06F 21/554 |
| 2025/0217863 A1 * | 7/2025 | Tunkelang | .......... | G06F 16/9535 |

OTHER PUBLICATIONS

Yilmas, E.H., "KLOOS: KL Divergence-based Out-of-Scope Intent Detection in Human-to-Machine Conversations," SIGIR Virtual Event, 2020, pp. 2105-2108.
International Search Report and Written Opinion issued in related international application No. PCT/US2025/026032 mailed Jul. 7, 2025.

* cited by examiner

*Primary Examiner* — Eddy Cheung
(74) *Attorney, Agent, or Firm* — Ballard Spahr LLP

(57) ABSTRACT

Methods, systems, and non-transitory computer readable storage media are disclosed for controlling access to artificial intelligence systems based on determined intent of queries. The disclosed system utilizes one or more digital content analysis models to determine an intent of one or more queries to an artificial intelligence system. The disclosed system utilizes the one or more digital content analysis models to determine an intended use of the artificial intelligence system. Additionally, the disclosed system determines whether the intent of the one or more queries aligns with the intended use of the artificial intelligence system by generating a similarity score and comparing the similarity score to a similarity threshold. Based on whether the intent aligns with the intended use, the disclosed system executes computing instructions to enable or block the one or more queries from being processed by the artificial intelligence system.

20 Claims, 10 Drawing Sheets

900

Determining An Intent Of One Or More Queries To An Artificial Intelligence System *902*

Determining An Intended Use Of The Artificial Intelligence System From Documentation *904*

Generating A Similarity Score For The Intent And Intended Use *906*

Enabling Processing Of The One Or More Queries *908a*

Blocking Processing Of The One Or More Queries *908b*

ENABLING OR BLOCKING PROCESSING OF QUERIES TO AN ARTIFICIAL INTELLIGENCE SYSTEM BASED ON INTENTS OF THE QUERIES

BACKGROUND

Advances in computer processing and data storage technologies have led to significant advances in the use of artificial intelligence for many different purposes. For instance, many entities utilize artificial intelligence to provide interaction interfaces with users or to interface with other computing systems and perform a variety of different tasks. To illustrate, many entities utilize large language models (or other generative neural networks), data analysis neural networks, or other machine-learning models to implement interactive tools for providing support, content generation and editing, data analysis, or other computational tasks.

Because machine-learning is such an integral part of so many computing processes, ensuring that the machine-learning models are utilized in a way that they were intended is an important and often challenging aspect of ensuring that the computing processes are accurate and efficient. For example, an entity that has implemented one or more large language models in connection with a chat bot that provides support to users via a chat interface has an interest in ensuring that the chat bot provides accurate and relevant information. Accordingly, bad actors or other users utilizing the chat bot in ways that deviate from the intended use (e.g., by submitting queries unrelated to support issues) can often have an impact on the training and outputs of the chat bot.

Some conventional systems rely on built-in guardrails for machine-learning models (e.g., through specialized training) to prevent misuse of the models. Although such guardrails can be useful in preventing certain types of misuse by the models, implementing such guardrails can require very specific training datasets and/or a significant amount of processing time and resources. Additionally, such protections can lead to inconsistency with edge cases for similar (but not exactly the same) scenarios or across domains. Thus, the conventional systems are often inaccurate and inefficient.

Furthermore, some conventional systems use content classification to determine specific types of data provided to machine-learning models in connection with managing use of machine-learning models. Although such conventional systems allow for preventing machine-learning models to access/obtain certain data types (e.g., personally identifiable information), these systems are also limited in protecting the use of the models to intended uses. For example, bad actors can circumvent intended uses even using allowed data types or inputs through a series of inputs that circumvent or break controls associated with the machine-learning models. Thus, these conventional systems fail to protect the use of the machine-learning models in a variety of different scenarios. Accordingly, existing systems lack efficiency and accuracy in ensuring proper inputs and outputs of machine-learning models.

SUMMARY

This disclosure describes various aspects for controlling access to artificial intelligence systems based on determined intent of queries. For example, the disclosed systems utilize one or more digital content analysis models to determine an intent of one or more queries to an artificial intelligence system. Additionally, the disclosed systems utilize the digital content analysis model(s) to determine an intended use of the artificial intelligence system from documentation associated with the artificial intelligence system. The disclosed systems also compares the intent determined for the one or more queries to the intended use determined for the artificial intelligence system and generates a similarity score indicating the similarity of the intent and intended use. Based on a comparison of the similarity score to a similarity threshold indicating that the intent does or does not align with the intended use of the artificial intelligence system, the disclosed systems determine whether to enable or block processing of the one or more queries by the artificial intelligence system. Additionally, the disclosed systems execute computing instructions to enable or block processing of the one or more queries by the artificial intelligence system. The disclosed systems thus utilize content analysis to determine whether queries to an artificial intelligence system align with the intended use of the artificial intelligence system and enable or block access of the one or more queries to the artificial intelligence system.

BRIEF DESCRIPTION OF THE DRAWINGS

Various aspects will be described and explained with additional specificity and detail through the use of the accompanying drawings.

DETAILED DESCRIPTION

Figure 1:
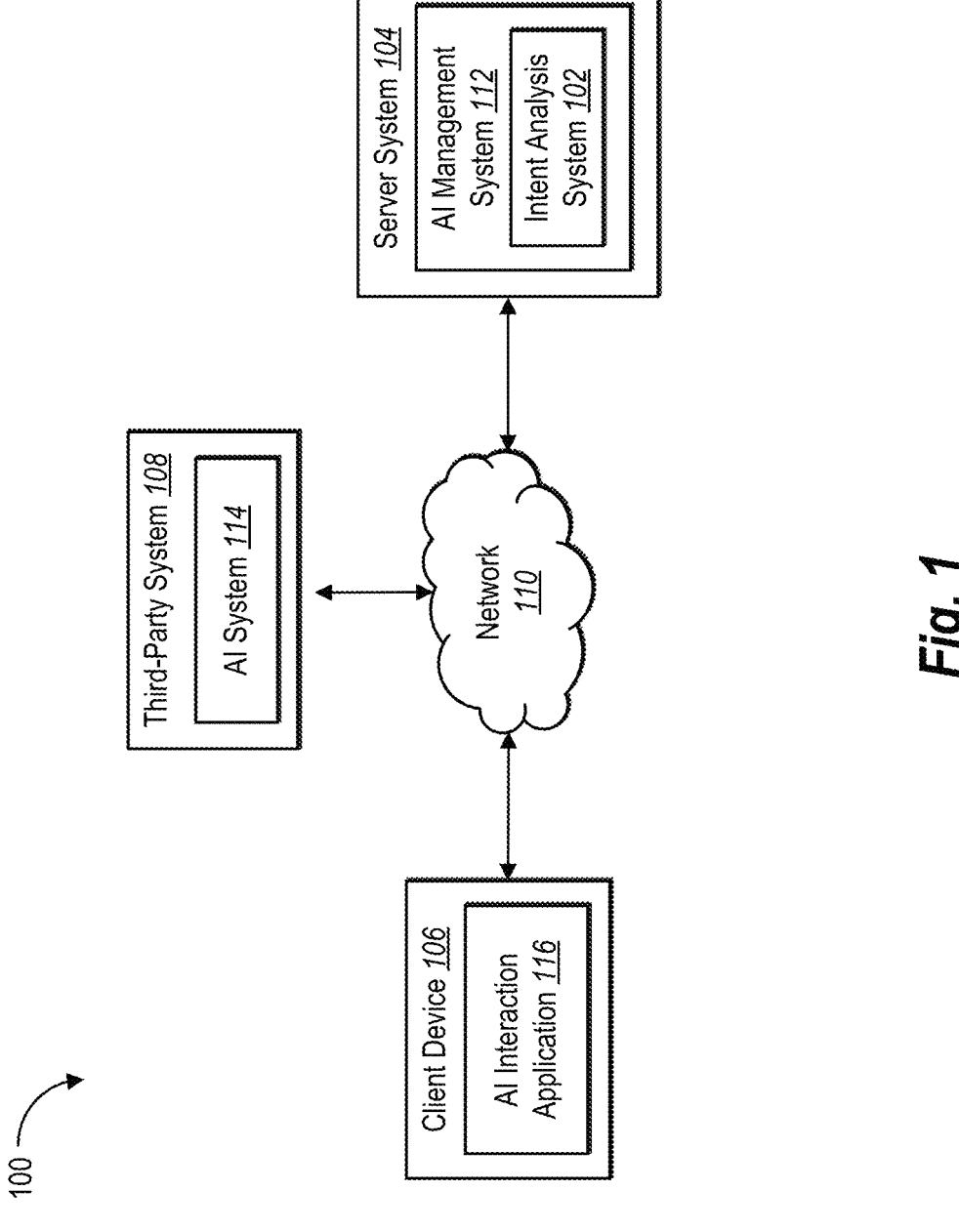
FIG. 1 illustrates an example of a system environment in which an intent analysis system can operate in accordance with some aspects.

This disclosure describes various aspects of an intent analysis system that enables or blocks processing of queries by an artificial intelligence system ("AI system") based on intents of the queries. For instance, the intent analysis system utilizes one or more digital content analysis models to analyze content of queries (e.g., prompts or other inputs) to an artificial intelligence system to determine intents of the queries. The intent analysis system also utilizes one or more digital content analysis models to analyze documentation associated with the artificial intelligence system to determine an intended use of the artificial intelligence system. The intent analysis system determines whether the queries' intents align with the intended use of the artificial intelligence system. The intent analysis system executes instructions to enable or block processing of the queries by the artificial intelligence system based on whether the intent aligns with the intended use. For instance, the intent analysis system allows processing of a query having an intent aligned with the intended use, but blocks processing of a query having an intent that is not aligned with the intended use.

An intent of a query is the underlying purpose or goal for which the query is submitted. In some aspects, the query is a latent feature of the query's content (e.g., the text, imagery, or other information or data comprising the query). In such aspects, the intent can be determined or estimated by applying an artificial intelligence model, such as a neural network, to the query to generate a latent representation (e.g., a vector) of the intent via analysis or processing of patterns, semantics, contextual clues, and other explicit features of the query. This latent representation enables the intent analysis system to perform one or more actions based on the intent. In some aspects, determining the intent involves the intent analysis system intercepting a query prior to the artificial intelligence system receiving the query. Intercepting a query includes, for example, pausing the provision of the query to an artificial intelligence system. During such a pause, the query can be processed or analyzed as described herein to determine whether to provide the query to the artificial intelligence system or block the query from being provided to the artificial intelligence system. For instance, the intent analysis system can utilize one or more digital content analysis models to analyze the content (e.g., text or image content) of the query and determine an intent of the query.

An intended use of an artificial intelligence system refers can include purposes, topics, data types, operation types, and other use cases for which the artificial intelligence system is designed and/or implemented. In some aspects, the intended use can be determined from documentation associated with the artificial intelligence system, such as information associated with the architecture, training data, hyperparameters, validation data, evaluation data, input data, or output data of the machine-learning models of the artificial intelligence system. For instance, the intent analysis system can access documentation associated with the artificial intelligence system, such as documentation associated with data used to train or implement the artificial intelligence system or documentation associated with a system requirements framework applicable to the artificial intelligence system. The intent analysis system utilizes the digital content analysis models to determine an intended use of the artificial intelligence system from the documentation. For instance, a digital content analysis model, such as a classification model, can be applied to this documentation and thereby output an intended use (e.g., a classification) for the artificial intelligence system.

In some aspects, the intent analysis system compares the intent of the query to the intended use of the artificial intelligence system to determine whether the intent aligns with the intended use. For instance, the intent analysis system generates a similarity score to indicate a similarity of the intent and the intended use. To illustrate, the intent analysis system generates the similarity score based on a comparison of text of the intent and intended use (e.g., by comparing concepts indicated by the intent and intended use).

Based on the similarity of the intent of the query and the intended use of the artificial intelligence system, the intent analysis system determines whether the intent sufficiently aligns with the intended use. In some aspects, the intent analysis system compares the similarity score to a similarity threshold. If the similarity score meets the similarity threshold, the intent analysis system determines that the intent aligns with the intended use and enables processing of the query by the artificial intelligence system. But if the similarity score does not meet the similarity threshold, the intent analysis system determines that the intent does not align with the intended use and blocks processing of the query by the artificial intelligence system. Thus, the intent analysis system either allows or does not allow the artificial intelligence system to respond to the query based on the intent of the query.

In some aspects, the intent analysis system improves upon shortcomings of conventional systems in relation to managing access to artificial intelligence systems. Managing access to artificial intelligence systems is an important aspect of ensuring that the artificial intelligence systems generate accurate and relevant information. In contrast to conventional systems that rely on highly specialized training to implement internal controls in machine-learning models, the intent analysis system utilizes intelligent query analysis to determine whether an intent of a query aligns with an intended use of an artificial intelligence system. The intent analysis system can restrict access to an artificial intelligence system for a query even prior to the artificial intelligence system receiving the query. Thus, the intent analysis system improves accuracy of the artificial intelligence system by preventing queries with intents not aligned with the intended uses of an artificial intelligence system from producing unintended results from the artificial intelligence system.

Furthermore, the intent analysis system improves accuracy of artificial intelligence systems by preventing queries with intents not aligned with the intended uses of the artificial intelligence systems from influencing training and/or outputs of the artificial intelligence systems. Specifically, because the intent analysis system intercepts queries before they reach the artificial intelligence systems, the intent analysis system can prevent the queries from being part of training data/processes for the artificial intelligence systems. Accordingly, the intent analysis system can prevent queries with misaligned intent from impacting performance of an artificial intelligence system while allowing queries with aligned intent to improve the accuracy performance of the artificial intelligence system.

Additionally, the intent analysis system utilizes intelligent intent analysis to improve the flexibility and efficiency of artificial intelligence systems in computing systems. For instance, in contrast to conventional systems that utilize data classifications to manage artificial intelligence systems, the intent analysis system utilizes intent analysis to implement access controls across a variety of domains and use cases. The intent analysis system can apply intent analysis to any number of queries for a variety of machine-learning models to determine whether the queries are aligned with the intended use of the machine-learning models even if the content of each of the queries is acceptable on their face.

Thus, the intent analysis system can prevent bad actors from attempting to use workarounds to fool artificial intelligence systems into being used in unintended or malicious ways.

In line with the improvements indicated above, various aspects of the intent analysis system improve computing systems implementing AI software by creating and using feature representations of latent characteristics of a query (e.g., encoded features of the query's intent) to improve computerized generation of content using AI models (e.g., generative models) or other computerized outputs of machine-learning models (e.g., search results using an AI-powered query engine, creative content generated in response to a prompt) according to feature representations of the AI model's intended use. Using the query intent in this manner allows the intent analysis system to address various problems arising in the realm of AI-based software. In one example, as mentioned above, ensuring alignment of a query's intent and an AI system's intended use can improve relevance and accuracy of content generated by the AI system by preventing poor quality data from being introduced into training datasets and by emphasizing positive examples of query intent in training data. In another example, aspects involving application of decision criteria (e.g., the requirement of a threshold similarity between feature representations of a query's intent and an AI system's intended use for processing of the query by the AI system) can improve the ability of generative AI software to create high-quality audiovisual content, such as by ensuring that prompts to the AI software target content for which the AI software is trained. To illustrate, by aligning the intent of queries processed by the AI software, the intent analysis system can prevent AI systems from attempting to generate audiovisual content for demographics, domains, data types, etc., outside of the trained parameters of the AI systems.

Turning now to the figures, FIG. 1 includes an example of a system environment 100 in which an intent analysis system 102 is implemented. The system environment 100 includes a server system 104, a client device 106, and a third-party system 108 in communication via a network 110. In some aspects, the server system 104 includes an artificial intelligence ("AI") management system 112, which further includes the intent analysis system 102. The third-party system 108 includes an AI system 114. The client device 106 includes an AI interaction application 116.

In some aspects, the server system 104 includes or hosts the intent analysis system 102. Specifically, the intent analysis system 102 includes, or is part of, one or more systems (e.g., the AI management system 112) that manages one or more AI systems (e.g., the AI system 114 at the third-party system 108). For example, the AI management system 112 provides tools to one or more systems to implement controls for training, implementing, and managing access to the AI systems. In some aspects, the AI management system 112 performs operations for managing access to AI systems by communicating with the AI systems and various computing devices attempting to access the AI systems. To illustrate, the AI management system 112 provides tools (e.g., one or more application programming interfaces) for the third-party system 108 to use in integrating the AI system 114 with the AI management system 112 (e.g., for managing the AI system 114).

Additionally, the AI management system 112 can utilizes the intent analysis system 102 to implement various controls associated with the AI system 114. For instance, the AI management system 112 utilizes the intent analysis system 102 to perform content analysis operations on queries submitted to the AI system 114. To do so, the intent analysis system 102 intercepts communications from the client device 106 (e.g., submitted via the AI interaction application 116). The intent analysis system 102 also performs operations to determine whether to enable or block queries to the AI system 114 from the client device 106 based on the intent of the queries and a set of requirements indicated by a system requirements framework, as explained below.

As used herein, the term "AI system" refers to a computing system that is or includes one or machine-learning models. In some aspects, the AI system 114 includes one or more machine-learning models to perform various computing operations. In some aspects, the AI system 114 includes one or more machine-learning models to communicate with one or more computing devices or computing systems to implement, for example, a chat bot, a system/data analysis model, content generation model, or other machine-learning based computing model.

As used herein, the term "machine-learning model" refers to a computer representation that is tuned (e.g., trained) based on inputs to approximate unknown functions. For instance, a machine-learning model could include a neural network having one or more layers or artificial neurons that approximate unknown functions by analyzing known data at different levels of abstraction. In some aspects, a machine-learning model includes one or more neural network layers including, but not limited to, a deep learning model, a convolutional neural network, a transformer neural network, a recurrent neural network, a fully-connected neural network, a classification neural network, or a combination of multiple neural networks and/or neural network types. In additional or alternative aspects, a machine-learning model includes a large language model or other generative neural network that generates digital text and/or digital image content. In additional or alternatives aspects, a machine-learning model generates computing code, such as application programming interface calls, to interact with computing systems. In some aspects, a digital content analysis model includes one or more neural networks indicated above to analyze text and/or image content to determine intent of a query and/or intended use of an AI system.

As used herein, the term "AI interaction application" refers to a computing application that provides tools and interfaces for interacting with an AI system. The AI interaction application 116 can include a standalone application or web interface with tools for providing queries to the AI system 114. For example, the AI interaction application 116 provides one or more interfaces (e.g., a chat interface, an application programming interface, or a command interface) for submitting queries to the AI system 114 for generating content, performing computing operations, or answering questions. Additionally, as used herein, the term "query" refers to a question, command, or call to an AI system 114 to perform one or more operations. As an example, a query includes a natural language question, an application programming interface call, or other prompt to a machine-learning model to perform an operation.

In some aspects, in connection with performing operations for managing controls and access to the AI system 114, the AI management system 112 and/or the intent analysis system 102 include one or more machine-learning models to perform various operations. For example, the AI management system 112 or the intent analysis system 102 includes one or more text processing neural networks or one or more image processing neural networks to analyze content of queries submitted to the AI system 114. Additionally, the AI management system 112 and/or the intent analysis system 102 can store datasets for training, evaluating, or validating the machine-learning models involved in performing the operations for managing controls or access to the AI system 114. In additional or alternative aspects, the AI management system 112 or the intent analysis system 102 access one or more machine-learning models stored on one or more other computing systems to perform such operations. Furthermore, in some aspects, the intent analysis system 102 accesses data (e.g., documentation) stored on one or more computing systems (e.g., the third-party system 108) to perform content analysis or other operations associated with managing controls or access to the AI system 114.

As used herein, the term "system requirements framework" refers to a data policy or a set of requirements for complying with various laws, regulations, or standards applicable to an entity. To illustrate, certain types of data or computing applications are subject to certain "data requirements," which refer to specific implementations of controls for handling (e.g., processing, transmitting, storing) data or performing operations in a computing environment. In some aspects, a system requirements framework includes policies internal to an entity or external policies applicable to entities in a given geographic region or industry. To illustrate, a system requirements framework includes specific requirements for handling data in view of a set of practices established by the International Organization for Standardization ("ISO"), internally by a particular organization (e.g., a multinational corporation), or a territory government (e.g., the European Union). In some examples, a system requirements framework includes requirements indicating types of data or functions that AI systems are allowed to perform, process, access, generate, or otherwise handle.

In some aspects, the third-party system 108 include server devices, individual client devices, or other computing devices associated with an entity. For instance, a third-party system includes one or more computing devices for performing operations associated with an entity. To illustrate, the third-party system 108 includes one or more server devices that generate, process, store, or transmit data from users (e.g., customers) of an entity in connection with providing customer support to the users.

In some aspects, the server system 104 include a variety of computing devices, including those described below with reference to FIG. 10. For example, the server system 104 includes one or more servers for storing and processing data associated with one or more AI systems of one or more entities. In some aspects, the server system 104 also include multiple computing devices in communication with each other, such as in a distributed storage environment. In various aspects, the server system 104 can include one or more of a content server, an application server, a communication server, a web-hosting server, a social networking server, a digital content campaign server, or a digital communication management server.

The client device 106 can perform functions such as, but not limited to, accessing, viewing, and interacting with the AI system 114 (e.g., via the AI interaction application 116). In some aspects, the client device 106 also performs functions for generating, capturing, or accessing data to provide to the AI management system 112 and/or the intent analysis system 102 in connection with accessing AI systems. For example, the client device 106 communicates with the server system 104 via the network 110 to provide information (e.g., user interactions) associated with entity data.

Although FIG. 1 illustrates the system environment 100 with a single client device, in some aspects, the system environment 100 includes multiple client devices. For instance, the system environment 100 can include one or more additional client devices for managing the AI management system 112 and/or the AI system 114. Examples of the client device 106 include, but are not limited to, a desktop, a mobile device (e.g., smartphone or tablet), or a laptop including those explained below with reference to FIG. 10. Furthermore, although not shown in FIG. 1, the client device 106 can be operated by users (e.g., a user included in, or associated with, the system environment 100) to perform a variety of functions.

Additionally, as shown in FIG. 1, the system environment 100 includes the network 110. The network 110 enables communication between components of the system environment 100. In some aspects, the network 110 may include the Internet or World Wide Web. In additional or alternative aspects, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server system 104, the client device 106, and the third-party system 108 communicate via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server system 104, the client device 106, and the third-party system 108 communicating via the network 110, in additional or alternative aspects, the various components of the system environment 100 communicate and/or interact via other methods (e.g., the server system 104, the client device 106, and/or the third-party system 108 can communicate directly). Furthermore, although FIG. 1 illustrates the intent analysis system 102 being implemented separately from the AI system 114 within the system environment 100, the intent analysis system 102 can alternatively be implemented, in whole or in part, with the AI system 114 by a particular component and/or device within the system environment 100 (e.g., the server system 104).

In some aspects, the server system 104 can support the intent analysis system 102 on the third-party system 108. For instance, the server system 104 generates/maintains the intent analysis system 102 and/or one or more components of the AI management system 112 and the intent analysis system 102 for the third-party system 108. The server system 104 provides the AI management system 112 and the intent analysis system 102 to the third-party system 108 (e.g., as part of a software application/suite). In other words, the third-party system 108 obtains (e.g., downloads) the AI management system 112 and the intent analysis system 102 from the server system 104. At this point, the third-party system 108 manages the AI system 114 via the components of the AI management system 112 and the intent analysis system 102 installed on the third-party system 108 independently from the server system 104.

In additional or alternative aspects, the AI management system 112 and/or the intent analysis system 102 include a web hosting application that allows the client device 106 to interact with the AI system 114 via content and services hosted on the server system 104. To illustrate, in some aspects, the client device 106 accesses a web page supported by the server system 104. The client device 106 provides input to the server system 104 to perform query operations, and, in response, the intent analysis system 102 on the server system 104 performs operations to view/manage access to the AI system 114 by the client device 106. The server system 104 provide the output or results of the operations to the client device 106.

Figure 2:
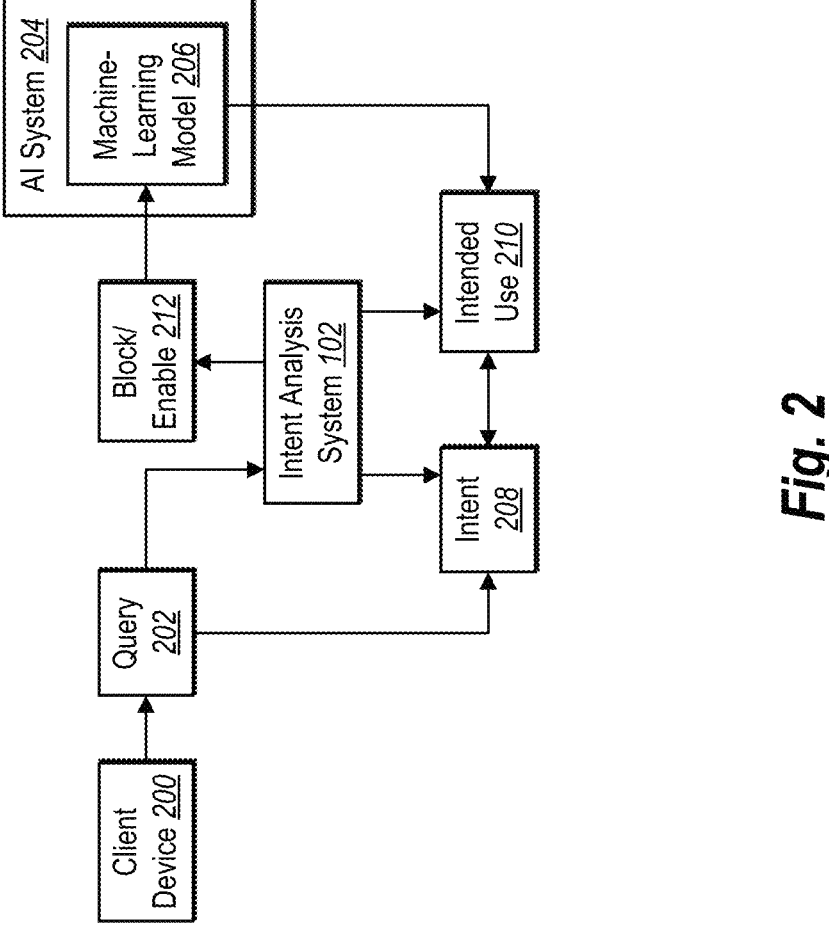
FIG. 2 illustrates an example of the intent analysis system determining whether to block or enable processing of a query by an artificial intelligence system based on intent of the query in accordance with some aspects.

The AI management system 112 provides management of AI systems for one or more entities, and the intent analysis system 102 provides intent analysis for controlling query access to the AI systems by one or more client devices. FIG. 2 illustrates an example of the intent analysis system 102 determining an intent of a query to determine whether to allow an AI system to process the query. In this example, the intent analysis system 102 compares the intent of the query to an intended use of the AI system to determine whether to enable or block the AI system from processing the query.

As illustrated in FIG. 2, a client device 200 submits a query 202 to an AI system 204 for performing an operation specified by the query 202. For example, the client device 200 submits the query 202 to the AI system 204 to cause a machine-learning model 206 to perform one or more operations based on the query 202. The query 202 can include, but is not limited to, a natural language question, a prompt to generate digital content, a prompt to perform a series of computing operations and/or communicate with one or more computing devices, or other queries to the machine-learning model 206.

Figure 3:
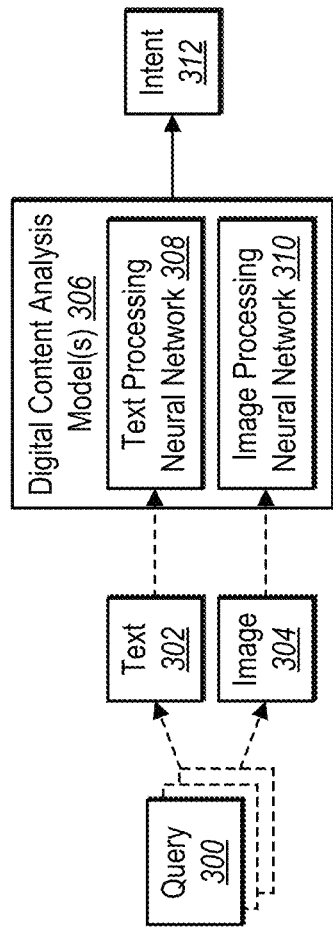
FIG. 3 illustrates an example of the intent analysis system determining an intent of a query to an artificial intelligence system in accordance with some aspects.

As illustrated, the intent analysis system 102 intercepts the query 202 to the AI system 204. In some aspects, the intent analysis system 102 resides between the AI system 204 and the client device 200 (and any other client devices submitting queries to the AI system 204). The intent analysis system 102 performs an analysis on the query 202 to determine an intent 208 of the query. Specifically, the intent analysis system 102 utilizes one or more digital content analysis models to determine the intent 208, such as by analyzing text or other content of the query 202 utilizing one or more text processing neural networks or image processing neural networks. FIG. 3 and the corresponding description provide additional detail related to determining intent of a query.

Figure 4:
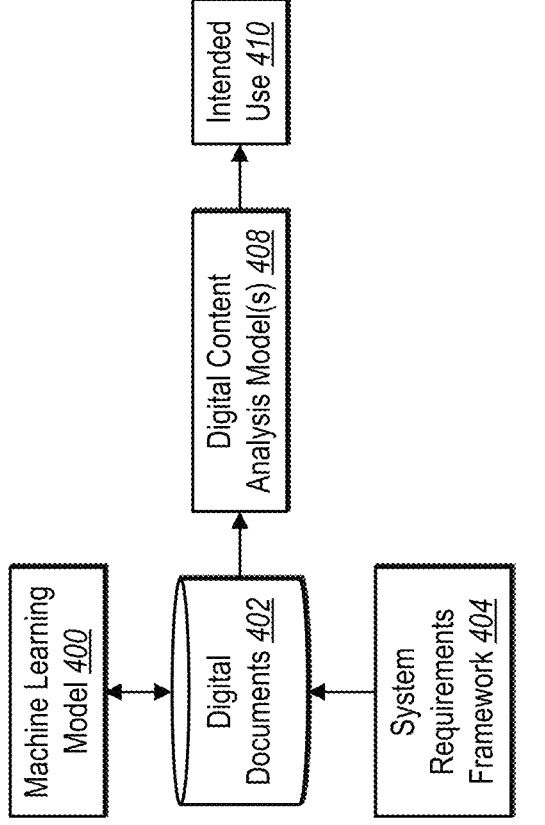
FIG. 4 illustrates an example of the intent analysis system determining an intended use of a machine-learning model in accordance with some aspects.

Additionally, as FIG. 2 illustrates, the intent analysis system 102 determines an intended use 210 of the AI system 204. In some aspects, the intent analysis system 102 determines the intended use 210 by utilizing the one or more digital content analysis models to analyze documentation associated with the machine-learning model 206. Accordingly, the intent analysis system 102 can determine that the AI system 204 is intended to be used for specific topics, with specific types of data, for specific types of operations, or other limited use cases. FIG. 4 and the corresponding description provide additional detail related to determining an intended use of an AI system.

Figure 5:
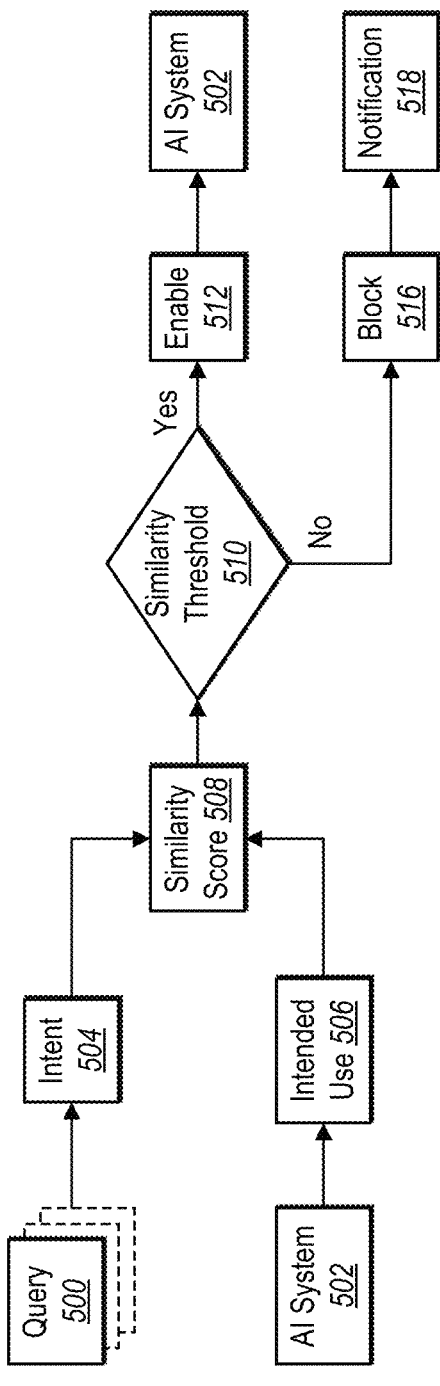
FIG. 5 illustrates an example of the intent analysis system utilizing a similarity score of an intent of a query and an intended use of an artificial intelligence system to determine whether to enable or block processing of the query in accordance with some aspects.

In response to determining the intent 208 of the query 202 and the intended use 210 of the AI system 204, the intent analysis system 102 performs an act 212 to block or enable processing of the query 202 by the AI system 204. Specifically, the intent analysis system 102 determines whether the intent 208 aligns with the intended use 210 by generating a similarity score. The intent analysis system 102 also executes computing instructions to block or enable processing of the query 202 by the AI system 204 based on the similarity score. FIG. 5 and the corresponding description provide additional detail related to determining whether to block or enable processing of a query by an AI system based on whether the query aligns with an intended use of the AI system.

The intent analysis system 102 can determine an intent of a query utilizing one or more digital content analysis models. FIG. 3 illustrates that the intent analysis system 102 determines an intent of one or more queries submitted by a client device to an AI system. In this example, the intent analysis system 102 utilizes intelligent intent analysis via one or more digital content analysis models to determine the intent of the one or more queries, such as based on text/ image understanding.

In some aspects, the intent analysis system 102 determines a query 300 (or multiple queries) submitted by a client device to an AI system. For instance, the intent analysis system 102 includes a proxy that intercepts the query 300 during one or more interactions with the AI system. To illustrate, the intent analysis system 102 intercepts the query 300 in connection with a chat interaction with a chat bot implemented utilizing the AI system (e.g., one or more chat messages by a user to the chat bot). In various aspects, the intent analysis system 102 intercepts all queries by the client device to the AI system to determine whether any of the queries begins to deviate from the intended use of the chat bot.

In some aspects, in response to intercepting the query 300, the intent analysis system 102 determines content of the query 300. For instance, the intent analysis system 102 determines whether the query 300 includes text 302 or an image 304. To illustrate, the query 300 can include text 302 in the form of natural language phrases or sentences or other text-based calls to a machine-learning model to cause the machine-learning model to generate content (e.g., answers, code) or perform operations (application programming interface calls). In some aspects, the query 300 includes an image 304 for conditioning an AI system (e.g., an image generation neural network) based on the image 304. In some aspects, the query 300 includes both text and image content.

Accordingly, in some aspects, the intent analysis system 102 utilizes digital content analysis model(s) 306 to analyze the content of the query 300. In these aspects, the intent analysis system 102 utilizes a text processing neural network 308 to process text 302 in the query 300. For example, the intent analysis system 102 utilizes a natural language processing neural network to parse and interpret the text 302 in the query 300. Furthermore, in some aspects, the intent analysis system 102 utilizes the text processing neural network 308 to parse and interpret text in multiple queries, such as a sequence of queries issued to the AI system. Thus, the intent analysis system 102 can analyze text from a single query individually and a sequence of queries as a group.

Furthermore, in some aspects, the intent analysis system 102 utilizes an image processing neural network 310 to process an image 304 of the query 300. For instance, the intent analysis system 102 utilizes one or more object detection neural networks, object classification neural networks, segmentation neural networks, or other image processing neural networks to process the image 304. To illustrate, the intent analysis system 102 can utilize the image processing neural network 310 to determine both content and context of the image 304. Additionally, in some aspects, the intent analysis system 102 utilizes the image processing neural network 310 in combination with the text processing neural network 308 to analyze the image 304 in connection with the text 302 (e.g., for a query or sequence of queries that contain both text and image content).

In some aspects, the intent analysis system 102 determines an intent 312 of the query 300 based on the content analysis performed by the digital content analysis model(s) 306. For instance, the intent analysis system 102 determines the intent 312 to include one or more domains/topics, data types, operation types, purposes, etc., of the query 300 based on text analysis and/or image analysis. In an illustrative example, the intent analysis system 102 can determine that the query 300 is intended to cause the AI system to generate or produce a specific data type, answer, or series of operations. Additionally, in some aspects, the intent analysis system 102 stores the intent 312 separately from the AI system, such that the AI system cannot access the query 300 or the intent 312 during analysis of the intent 312.

According to some aspects, the digital content analysis model(s) 306 include one or more classification neural networks to determine the intent 312 based on one or more classifications of content in the query 300. For instance, the digital content analysis model(s) 306 generate probabilities of classifications for the query 300 based on multiple trained classifiers. Thus, the classifiers generate probabilities that the content of the query 300 belongs to each of multiple classifications. The intent analysis system 102 can determine the intent 312 based on the generated probabilities, such that the classification with the highest probability indicates the intent 312. In some aspects, the intent analysis system 102 determines multiple possible intents by comparing the probabilities to a threshold probability, such that any of the possible classifications with probabilities above the threshold may be the intent 312.

In some aspects, the intent analysis system 102 determines the intent 312 based on the query 300 in connection with one or more additional queries. Specifically, the intent analysis system 102 can determine separate intents of each individual query in a sequence of queries and a combined intent of multiple queries. For example, a client device may issue multiple queries to an AI system with different individual intents while attempting to achieve a combined intent based on the combination of queries. Accordingly, the intent analysis system 102 can analyze the queries individually to determine the separate intents and analyze the queries as a group to determine a combined intent (e.g., by generating a single classification for the queries as a group). Alternatively, the intent analysis system 102 can analyze the intents of the separate queries to determine the combined intent (e.g., via a mapping or classification of the intents as a group utilizing the text processing neural network 308).

To illustrate, the intent analysis system 102 may determine that the intent of a first query includes determining information for a first data type or operation type, and the intent of a second query includes determining information for a second data type or operation type. Based on the intent of the first query and the intent of the second query, the intent analysis system 102 can determine that the combined intent of the first query and the second query is a third intent. Thus, the intent analysis system 102 can detect malicious intent (or otherwise unaligned intent) even if individual queries to the AI system are otherwise innocuous or aligned with the intended use of the AI system.

The intent analysis system 102 can also determine an intended use of an AI system in connection with determining an intent of a query. FIG. 4 illustrates an example of the intent analysis system 102 determining one or more intended uses of an AI system based on documentation associated with the AI system. For instance, the intent analysis system 102 determines the intended use from digital documents stored for the AI system or for policies/regulations corresponding to the AI system.

In one or more aspects, the intent analysis system 102 determines a machine-learning model 400 of an AI system. An AI system can have any number of machine-learning models for various purposes in connection with performing one or more operations. For example, the AI system can include one or more generative neural networks (e.g., a large language model and an image generation neural network), content editing neural networks (e.g., an image editing neural network, a mask generation neural network), content analysis neural networks, and/or one or more neural networks to perform additional computing operations.

In connection with determining the machine-learning model 400, the intent analysis system 102 also determines digital documents 402 associated with the machine-learning model 400. The digital documents 402 can include documentation stored for the implementation of the machine-learning model 400. For instance, the digital documents 402 include computing files including information associated with an architecture of the machine-learning model 400, training data or processes for the machine-learning model 400, hyperparameters of the machine-learning model 400, validation data for the machine-learning model 400, evaluation data for the machine-learning model 400, input data to the machine-learning model 400, or output data generated by the machine-learning model 400. In some aspects, the intent analysis system 102 determines information describing the above-indicated data or the data itself (e.g., training datasets) from metadata stored by or with the machine-learning model 400, computing devices (e.g., digital data repositories) communicating with the machine-learning model 400, application programming interfaces associated with the machine-learning model 400, or other sources of data linked to the machine-learning model 400.

Furthermore, in some aspects, the digital documents 402 include documentation related to a system requirements framework 404 that corresponds to the machine-learning model 400. For example, the intent analysis system 102 determines that one or more laws, regulations, standards, policies, or other set of requirements are applicable to training or operation of the machine-learning model 400. To illustrate, the system requirements framework 404 can include a set of data requirements that indicate how the machine-learning model 400 handles certain types of data, performs certain types of operations, obtains data in specific ways, or communicates with certain devices, among other possible restrictions or limitations. The system requirements framework 404 can be an external or internal set of requirements for the machine-learning model 400 relative to an entity. Accordingly, the digital documents 402 can include information related to the system requirements framework 404, including a set of data requirements, information indicating a scope of the system requirements framework 404 for the machine-learning model 400, etc.

In some aspects, the intent analysis system 102 utilizes digital content analysis model(s) 408 to analyze the digital documents 402. Specifically, the intent analysis system 102 determines an intended use 410 of the machine-learning model 400 based on the output of the digital content analysis model(s) 408. For example, as described above with respect to FIG. 3, the intent analysis system 102 can determine the intended use 410 by analyzing text and/or image content in the digital documents 402. To illustrate, the intent analysis system 102 utilizes one or more classifier neural networks to classify text and/or image content in the digital documents 402 according to a set of classifications indicating various possible intended uses.

As an example, the intent analysis system 102 utilizes the digital content analysis model(s) 408 to generate probabilities of classifications for the machine-learning model 400 based on the digital documents 402. Specifically, the intent analysis system 102 provides the digital documents 402 as inputs to the digital content analysis model(s) 408, which process the digital documents 402 and generate the probabilities of classifications of the intended use 410. As an example, the intent analysis system 102 generates encoded features of the digital documents 402 in a feature space utilizing an encoder neural network. Additionally, the intent analysis system 102 can generate probabilities of a set of predefined classifications (e.g., corresponding to classifiers of the digital content analysis model(s) 408) from content of the digital documents 402, which the intent analysis system 102 maps to the predefined classifications utilizing the classifiers of the digital content analysis model(s) 408. In some aspects, the intent analysis system 102 selects the intended use 410 based on the classification probabilities, such as by selecting the classification with the highest probability or a set of classifications based on a threshold probability.

FIG. 5 illustrates an example of the intent analysis system 102 determining whether to block or enable processing of a query by an AI system based on an intent of the query. In this example, the intent analysis system 102 determines whether the intent of the query aligns with an intended use of the AI system. Thus, the intent analysis system 102 can allow or prevent the query from being processed by the AI system depending on the alignment of the intent of the query with the intended use of the AI system.

As illustrated in FIG. 5, the intent analysis system 102 determines a query 500 to an AI system 502, such as in a sequence of queries to one or more machine-learning models of the AI system 502. Furthermore, in some aspects, the intent analysis system 102 determines an intent 504 of the query (or queries) and an intended use 506 of the AI system 502. To illustrate, the intent analysis system 102 utilizes one or more digital content analysis models to determine the intent 504 of the query 500 and/or the intended use 506 of the AI system 502.

In some aspects, the intent analysis system 102 determines whether the intent 504 aligns with the intended use 506. The intent analysis system 102 compares the intent 504 to the intended use 506 to generate a similarity score 508 indicating a similarity of the intent 504 and the intended use 506. For instance, the intent analysis system 102 generates the similarity score 508 by determining a semantic similarity between the intent 504 and the intended use 506, such as by using a language processing neural network to compare one or more words or phrases in the intent 504 to one or more words or phrases in the intended use 506. In some aspects, the intent analysis system 102 utilizes a large language model to generate the similarity score 508. For example, a large language model includes or refers to one or more transformer-based neural networks capable of processing language-based prompts (e.g., natural language text) to generate outputs that range from predictive outputs, analyses, or combinations of data within stored content items. A large language model includes parameters trained (e.g., via deep learning) on large amounts of data to learn patterns and rules of language for summarizing and/or generating digital content.

In some aspects, the intent analysis system 102 utilizes the similarity score 508 to determine whether the intent 504 of the query 500 aligns with the AI system 502. Specifically, the intent analysis system 102 can compare the similarity score 508 to a similarity threshold 510 to determine whether the intent 504 aligns with the intended use 506. For example, in response to determining that the similarity score 508 meets (e.g., is equal to or greater than) the similarity threshold 510, the intent analysis system 102 determines that the intent 504 aligns with the intended use 506. Alternatively, in response to determining that the similarity score 508 does not meet (e.g., is lower than) the similarity threshold 510, the intent analysis system 102 determines that the intent 504 does not align with the intended use 506. As an example, the intent analysis system 102 can determine that the intent 504 does not align with the intended use 506 of the AI system 502 in response to determining that the query is requesting generation of content for a set of demographics on which the AI system 502 is not trained. In an additional example, the intent analysis system 102 can determine that the query 500 is requesting that the AI system 502 perform operations to communicate with one or more computing devices to which the AI system 502 should not communicate (e.g., via application programming interface calls).

In some aspects, the intent analysis system 102 compares multiple intents associated with multiple queries in a sequence of queries to the intended use 506. For example, the intent analysis system 102 can determine intents for individual queries in a sequence in addition to a combined intent for the sequence of queries. The intent analysis system 102 can thus generate similarity scores for each of the individual intents relative to the intended use 506 as well as for the combined intent. Accordingly, in some aspects, the intent analysis system 102 can determine whether the sequence of queries has one or more intents aligned with the intended use 506 of the AI system 502 based on the individual intents of the individual queries or the combined intent of the sequence of queries.

According to some aspects, the intent analysis system 102 determines whether to allow processing of the query 500 by the AI system 502 based on whether the intent 504 is aligned with the intended use 506 of the AI system 502. For example, as illustrated in FIG. 5, in response to determining that the similarity score 508 meets the similarity threshold 510, the intent analysis system 102 performs an act 512 to enable processing of the query 500 by the AI system 502. To illustrate, the intent analysis system 102 executes computing code to enable processing of the query 500 by the AI system 502, such as by forwarding the query 500 to the AI system 502 after intercepting the query 500.

Additionally, in some aspects, in response to determining that the similarity score 508 does not meet the similarity threshold 510, the intent analysis system 102 performs an act 516 to block processing of the query 500 by the AI system 502. For example, the intent analysis system 102 executes computing code to block processing of the query 500 by the AI system 502, such as by preventing the AI system 502 from receiving the query 500. To illustrate, the intent analysis system 102 can execute an operation to stop forwarding of the query 500 to the AI system 502. Furthermore, the intent analysis system 102 can also prevent additional queries from the client device that issued the query 500 from being forwarded to the AI system 502. For example, the intent analysis system 102 can terminate a connection between the client device that issued the query 500 and the AI system 502.

In some aspects, the intent analysis system 102 blocks processing of the query 500 until one or more operations are performed on the query 500. For example, the intent analysis system 102 can utilize (or communicate with) a content modification model to mask or redact certain information from the query 500 prior to processing by the AI system 502. To illustrate, the intent analysis system 102 can utilize a content modification model to redact certain data types (e.g., personally identifiable information) from the query 500 to prevent the AI system 502 from having access to the data types. In some aspects, the intent analysis system 102 sends the query to a third-party system to perform the redaction operations prior to sending the query 500 to the AI system 502.

In additional or alterative aspects, the intent analysis system 102 compares multiple similarity scores of multiple intents related to a query to the similarity threshold 510. For instance, the intent analysis system 102 can determine multiple possible intents of the query 500 based on a set of classifiers and probabilities determined for the possible intents. To illustrate, a digital content analysis model can generate multiple probabilities that meet a probability threshold for determining the intent 504 of the query 500, resulting in the intent analysis system 102 selecting the corresponding classifications as possible intents for the query 500. The intent analysis system 102 generates similarity scores for the possible intents and compares the similarity scores to the similarity threshold 510. In response to determining that any of the similarity scores are below the similarity threshold 510, the intent analysis system 102 can execute instructions to block the query 500 from being processed by the AI system 502.

In some aspects, blocking the query 500 from being processed by the AI system 502 also involves generating a notification 518 of the query 500 being blocked. For instance, the intent analysis system 102 can generate a notification indicating that the query 500 was blocked and that a communication session with the AI system 502 was terminated. The intent analysis system 102 can provide the notification 518 to the client device that issued the query 500. Furthermore, in some aspects, the intent analysis system 102 generates an additional notification to one or more third-party systems, such as a review system, to allow the third-party system(s) to take additional actions in relation to the query 500. To illustrate, a third-party system can review the determination to block the query 500 and determine whether the decision was correct or incorrect, and if incorrect, take action to overturn the decision or whether to make modifications to the intent analysis system 102 (e.g., retraining of one or more models involved).

In some aspects, the intent analysis system 102 also provides an option (e.g., with the notification 518) for a user to provide feedback in relation to the decision for the query 500. For instance, if a user disagrees with the decision, the user can provide feedback (e.g., via the client device) to the intent analysis system 102 indicating additional information about the intent 504. The intent analysis system 102 can take the user feedback into consideration and re-evaluate the intent 504, such as by generating a new similarity score based on the user feedback. Alternatively, the intent analysis system 102 can provide the additional information to a third-party system (e.g., an administrator device) to review the query 500 in light of the additional information and determine whether to enable or block processing of the query 500 by the AI system 502.

Figure 6:
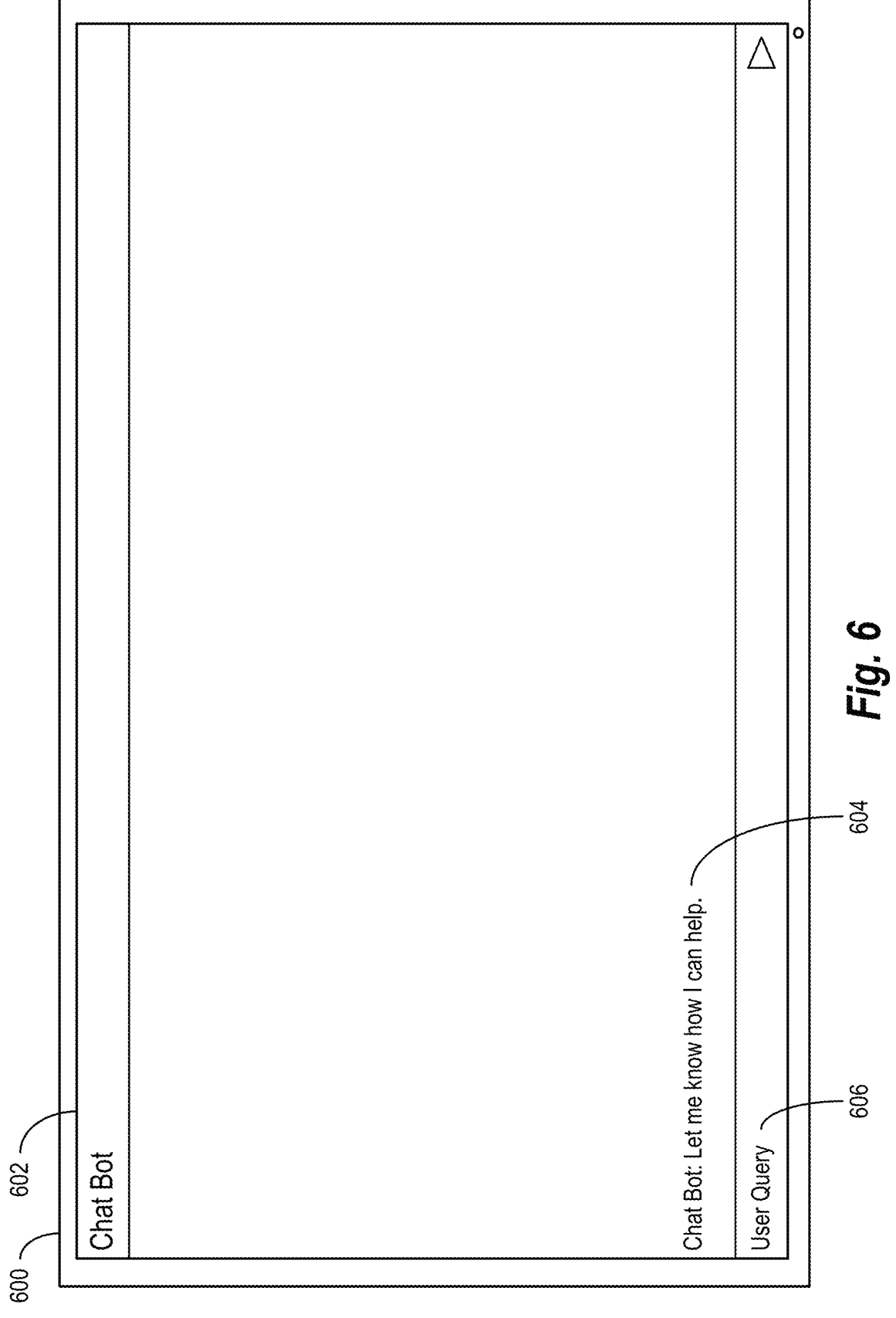
FIG. 6 illustrates a graphical user interface for interacting with a chat bot associated with an artificial intelligence system in accordance with some aspects.
Figure 7:
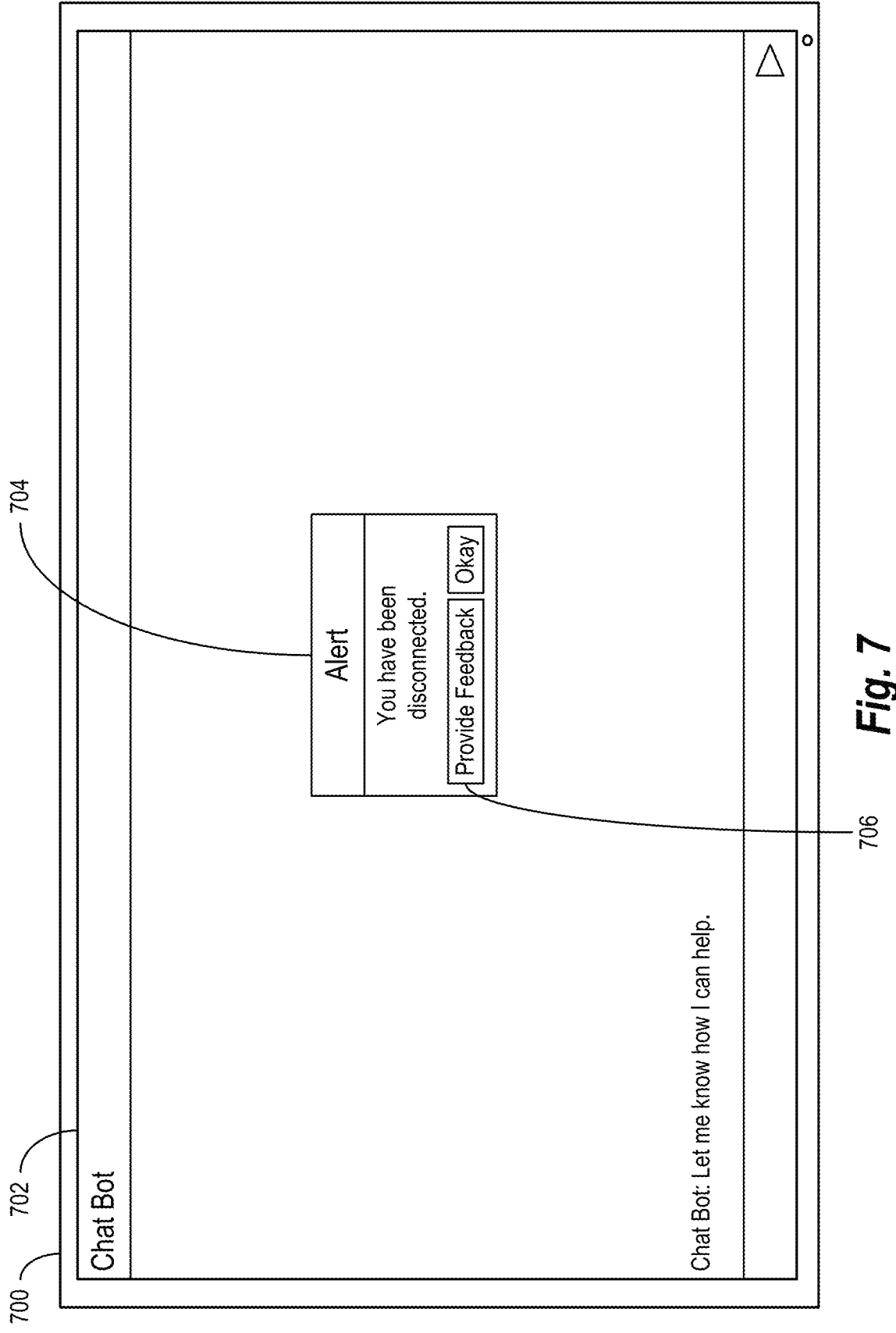
FIG. 7 illustrates a graphical user interface for notifying a user of a query being blocked from processing by an artificial intelligence system in accordance with some aspects.

FIGS. 6-7 illustrate example graphical user interfaces associated with a communication between a client device and an AI system. For example, FIG. 6 illustrates a client device 600 that displays a chat interface 602 for sending and receiving messages to a chat bot incorporating one or more machine-learning models (e.g., a large language model). To illustrate, the chat interface 602 includes a portion displaying messages generated by the AI system (e.g., message 604) and/or messages sent by the user. For example, the chat bot provides an interactive message interface for a telemedicine consultation to allow users to request a prescription for medications or customer support for a user having issues with a specific device purchased from the entity.

Additionally, the chat interface 602 includes an input field 606 for a user to input a query via the client device. In some aspects, as previously indicated, the chat bot includes an intended use, such as for providing customer support, providing general answers to questions, performing operations in specific computing environments, etc. Furthermore, although FIG. 6 illustrates the chat interface 602 for providing queries to an AI system in the form of natural language text queries, in other aspects, an AI system provides options to submit queries including images, application programming interface calls, complex prompts, or other forms of input.

In response to a query entered into the chat interface 602 via the input field 606, the intent analysis system 102 intercepts the query from the client device (e.g., before the query reaches the AI system). The intent analysis system 102 determines the intent of the query intercepted from the client device utilizing one or more digital content analysis models. In some aspects, the intent analysis system 102 determines the intent of the query in connection with one or more other previously submitted queries to the AI system (e.g., which may be displayed in the chat interface 602). For instance, the intent analysis system 102 can determine that the intent of a user is to request a prescription to a medicine that is potentially illegal or that requires a doctor to prescribe. Alternatively, the intent analysis system 102 determines that the intent of the user is to obtain personally identifiable information to which the user should not have access with the intent to impersonate the person.

Furthermore, the intent analysis system 102 determines whether to enable or block processing of the query by the AI system based on whether the intent of the query aligns with the intended use of the AI system. More specifically, the intent analysis system 102 generates a similarity score based on the intent of the query (or sequence of queries) and the intended use of the AI system. The intent analysis system 102 compares the similarity score to a similarity threshold and thus determines whether to enable or block processing of the query by the AI system.

FIG. 7 illustrates an example of a graphical user interface displaying information indicating that a query has been blocked from processing by an AI system. For example, FIG. 7 illustrates a client device 700 that displays a chat interface 702 for a chat bot including one or more machine-learning models implemented by an AI system. In some aspects, in response to determining that a determined intent of a query (or a sequence of queries) submitted by the client device 700 to the AI system does not align with the intended use of the AI system, the intent analysis system 102 can block processing of the query (or queries) by the AI system.

In connection with blocking processing of the query by the AI system, the intent analysis system 102 can also generate a notification 704 to provide for display at the client device 700. For instance, the intent analysis system 102 generates the notification 704 to include an indication that the intent analysis system 102 blocked the query from processing by the AI system or that the intent analysis system terminated a connection between the client device 700 and the AI system. Furthermore, the notification 704 can include (or otherwise be displayed with) a feedback option 706 to provide feedback to the intent analysis system in relation to the determination to block the query from processing by the AI system. For example, in response to a selection of the feedback option 706, the client device 700 displays an interface or overlay for the user to provide feedback regarding the decision (e.g., additional information associated with the intent of the query) for the intent analysis system 102 or a third-party system to use in evaluating the decision or for further improving the performance of the intent analysis system 102.

Figure 8:
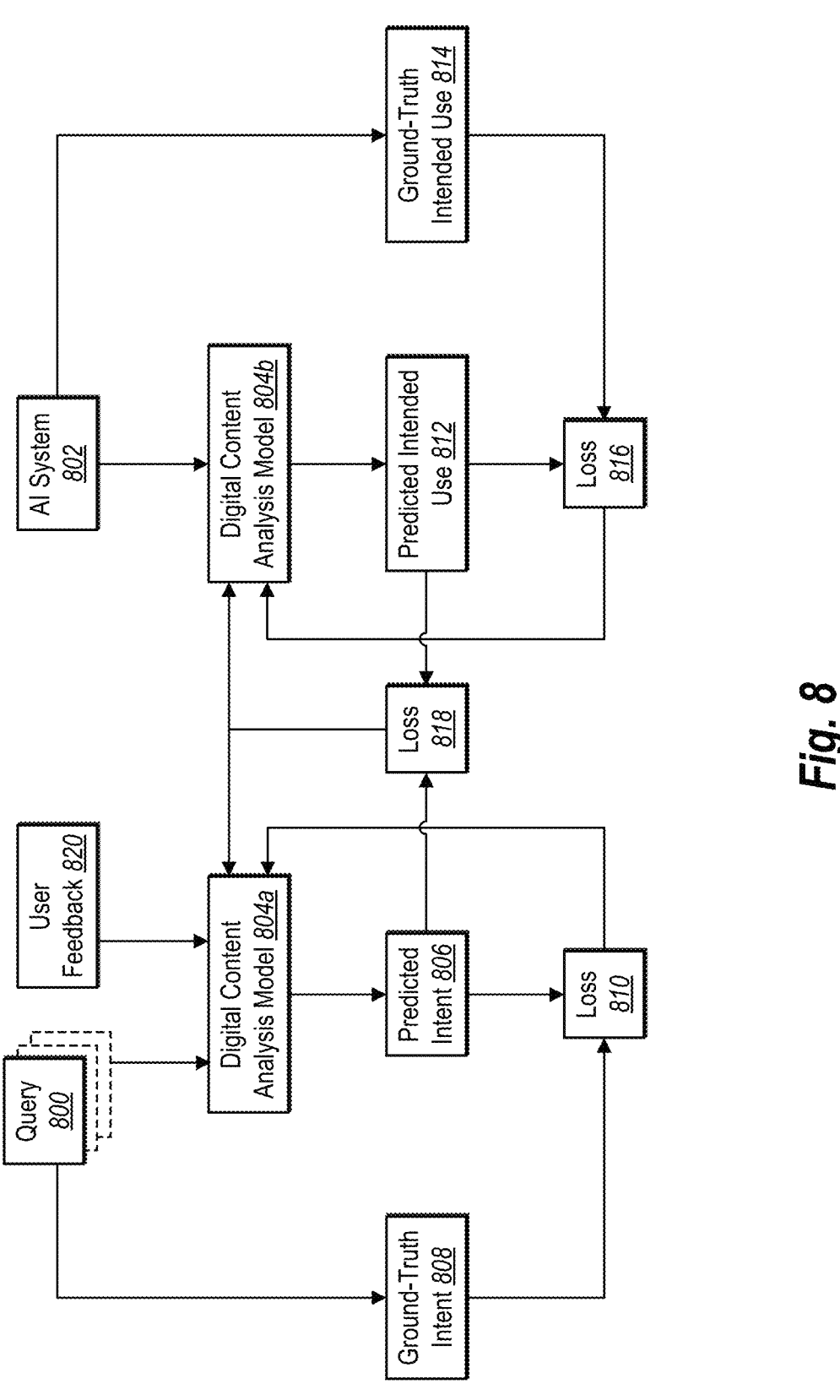
FIG. 8 illustrates an example of the intent analysis system training a digital content analysis model to predict intents of queries to an artificial intelligence system in accordance with some aspects.

FIG. 8 illustrates an example of the intent analysis system 102 utilizing data associated with determining whether an intent of a query aligns with an intended use of an AI system to further train one or more models used to determine the intent/intended use. In this example, the intent analysis system 102 determines a query 800 to an AI system 802. In response to determining the query 800, the intent analysis system 102 utilizes a digital content analysis model 804a to determine a predicted intent 806 of the query 800. For instance, the intent analysis system 102 utilizes a text processing neural network and/or an image processing neural network to generate the predicted intent 806 as a classification of multiple possible classifications.

Furthermore, in connection with generating the predicted intent 806 utilizing the digital content analysis model 804a, the intent analysis system 102 determines a ground-truth intent 808 for the query 800. For example, the intent analysis system 102 determines the ground-truth intent 808 based on an input provided by an administrator client device or third-party system, such as an annotation of the ground-truth intent 808 as reviewed by an administrator user associated with the intent analysis system 102 after intercepting the query 800. Alternatively, the query 800 includes a query selected from a historical dataset of past queries with known intents (e.g., marked by users that submitted the queries or by one or more users of a third-party system).

The intent analysis system 102 determines a loss 810 based on a difference between the predicted intent 806 and the ground-truth intent 808. For example, the intent analysis system 102 determines the loss 810 by determining a distance between the predicted intent 806 and the ground-truth intent 808. To illustrate, the intent analysis system 102 converts the predicted intent 806 and the ground-truth intent 808 to a feature space utilizing a feature extraction neural network (e.g., a convolutional neural network) resulting in multiple feature vectors. The intent analysis system 102 determines the difference between the corresponding feature vectors and generates the loss 810 indicating the difference between the feature vectors utilizing a loss function, such as by determining a Euclidean difference in the feature space.

Furthermore, in some aspects, the intent analysis system 102 utilizes the loss 810 to update the digital content analysis model 804a. For example, the intent analysis system 102 utilizes the loss 810 to modify parameters of the digital content analysis model 804a to reduce a difference between the predicted intent 806 and the ground-truth intent 808. The intent analysis system 102 modifies the parameters of the digital content analysis model 804a to output a predicted intent for the query 800 that matches (or is closer to) the ground-truth intent 808.

In some aspects, the intent analysis system 102 utilizes a digital content analysis model 804b to generate a predicted intended use 812 of the AI system 802. For instance, the digital content analysis model 804b can include the same neural network as the digital content analysis model 804a. Alternatively, the digital content analysis model 804b can include a different neural network than the digital content analysis model 804a tuned to determining intended uses of AI systems. In either case, the intent analysis system 102 generates the predicted intended use 812 to indicate a likely intended use based on one or more possible classifications of the intended use of the AI system 802.

According to some aspects, in connection with determining the predicted intended use 812 of the AI system 802, the intent analysis system 102 determines a ground-truth intended use 814 for the AI system 802. For example, the intent analysis system 102 utilizes input provided by one or more devices or systems (e.g., an administrator client device or a third-party system) to determine the ground-truth intended use 814. Additionally, the intent analysis system 102 determines a loss 816 based on a difference between the predicted intended use 812 and the ground-truth intended use 814. The intent analysis system 102 utilizes the loss 816 to modify parameters of the digital content analysis model 804b to reduce the difference between the predicted intended use 812 and the ground-truth intended use 814.

Furthermore, in some aspects, the intent analysis system 102 determines a loss 818 based on the predicted intent 806 and the predicted intended use 812. Specifically, the intent analysis system 102 compares the predicted intent 806 to the predicted intended use 812 to determine how closely the predicted intent 806 matches up to the predicted intended use 812 and determines the loss 818 based on the distance. By utilizing the ground-truth intent 808 and the ground-truth intended use 814 to ensure that the predicted intent 806 and the predicted intended use 812 are closer to their respective ground-truths, the intent analysis system 102 can provide a more accurate comparison of the predicted intent 806 and the predicted intended use 812. In some aspects, the intent analysis system 102 determines the loss 818 based on the ground-truth intent 808 and the ground-truth intended use 814 and uses the loss 818 to update the corresponding model(s).

In some aspects, the intent analysis system 102 utilizes the loss 818 to update parameters of the digital content analysis model 804a and/or the digital content analysis model 804b under certain scenarios. In some aspects, the intent analysis system 102 utilizes the loss 818 to update the digital content analysis model 804a and/or the digital content analysis model 804b in specific scenarios, such as in response to determining that the predicted intent 806 and the predicted intended use 812 are within a tolerance/threshold. Thus, the intent analysis system 102 utilizes positive samples of aligned intent and intended use to improve the performance of the digital content analysis model 804a and/or the digital content analysis model 804b. In additional examples, the intent analysis system 102 utilizes both positive and negative samples to update the model(s).

In additional aspects, the intent analysis system 102 utilizes user feedback 820 to improve the performance of the digital content analysis model 804a that determines intent of the queries. Specifically, the intent analysis system 102 receives user feedback 820 from a client device of the query 800 and/or a third-party system associated with reviewing the query 800. The intent analysis system 102 utilizes the user feedback 820 to update parameters of the digital content analysis model 804a by providing a new ground-truth intent to which the predicted intent 806 is compared and determining an updated loss. The intent analysis system 102 feeds the updated loss to the digital content analysis model 804a and modifies its parameters accordingly to reduce the difference between the predicted intent 806 and the new ground-truth intent corresponding to the user feedback 820. In some aspects, the intent analysis system 102 determines the new ground-truth intent by processing the user feedback 820 (e.g., with the query 800) via the digital content analysis model 804a.

Figure 9:
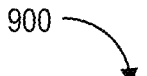
FIG. 9 illustrates an example flowchart of a process for blocking or enabling processing of queries to an artificial intelligence system based on determined intents of the queries in accordance with some aspects.
Figure 9:
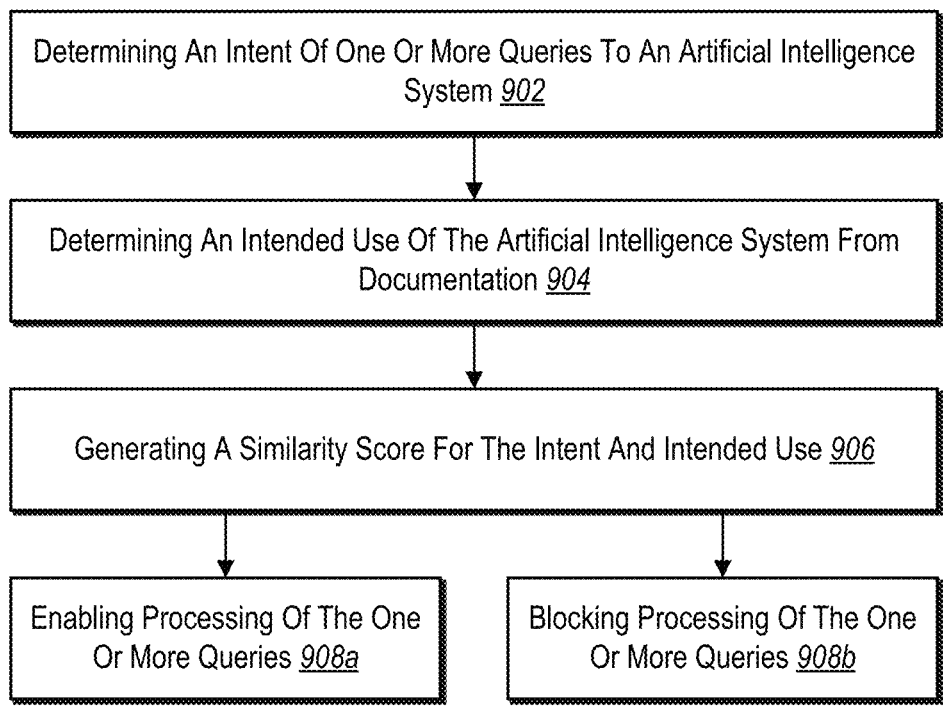

Turning now to FIG. 9, this figure shows a flowchart of a process 900 of blocking or enabling processing of queries to an AI system based on determined intents of the queries. While FIG. 9 illustrates acts according to one aspect, alternative aspects may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further aspects, a system (e.g., one or more systems described in FIGS. 1 and 10) can perform the acts of FIG. 9.

As shown, the process 900 includes an act 902 of determining an intent of one or more queries to an AI system. For example, act 902 involves determining, utilizing one or more digital content analysis models, an intent of one or more queries to an AI system based on digital content in the one or more queries. In some aspects, act 902 is implemented using one or more examples described above with respect to FIGS. 2-3.

The process 900 also includes an act 904 of determining an intended use of the AI system from documentation. For example, act 904 involves determining an intended use of the AI system from documentation associated with the AI system. In some aspects, act 904 is implemented using one or more examples described above with respect to FIGS. 2 and 4.

The process 900 also includes an act 906 of generating a similarity score for the intent and intended use. For example, act 906 involves generating a similarity score by comparing the intent of the one or more queries to the intended use of the AI system. In some aspects, act 906 is implemented using one or more examples described above with respect to FIGS. 2 and 5.

In various aspects, the process 900 also includes an act 908a of enabling processing of the one or more queries or an act 908b of blocking processing of the one or more queries. For example, act 908a involves, in response to a comparison between the similarity score and a similarity threshold, executing computing instructions to enable processing of the one or more queries by the AI system. Additionally, for example, act 908b involves, in response to a comparison between the similarity score and a similarity threshold, executing computing instructions to block processing of the one or more queries by the AI system. In some aspects, act 908a and 908b are implemented using one or more examples described above with respect to FIGS. 2 and 5.

In various aspects, act 902 involves intercepting the one or more queries from a query device to the AI system. Additionally, act 902 can involve determining one or more text strings or one or more digital images from the one or more queries. Act 902 can also involve determining the intent of the one or more queries by utilizing a text processing neural network or one or more image processing neural networks to perform a semantic analysis on the one or more text strings or the one or more digital images. Act 902 an also involve determining the one or more queries from a first text input previously entered into a chat interface with the AI system and a second text input being entered into the chat interface with the AI system.

In some aspects, act 904 involves accessing the documentation associated with the AI system from a computing system implementing the AI system. Act 904 can involve determining the intended use of the AI system from the documentation utilizing a text processing neural network.

Act 904 can also involve accessing, from a third-party computing system, a set of requirements for the AI system from a system requirements framework associated with the AI system. Act 904 can further involve determining the intended use of the AI system from the set of requirements and the documentation utilizing the text processing neural network.

In some aspects, act 908a involves determining that the similarity score of the one or more queries meets the similarity threshold. Act 908a also involves providing the one or more queries to one or more computing devices implementing the AI system.

In some aspects, act 908b involves determining that the similarity score of the one or more queries does not meet the similarity threshold. Act 908b also involves preventing one or more computing devices implementing the AI system from receiving the one or more queries.

The process 900 can also include determining a ground-truth intent for the one or more queries and a ground-truth intended use of the AI system. The process 900 can further include determining one or more losses based on the intent of the one or more queries, the intended use of the AI system, the ground-truth intent, and the ground-truth intended use. The process 900 can include determining, utilizing one or more loss functions, a first loss indicating a first difference between the intent of the one or more queries and the ground-truth intent. The process 900 can also include determining, utilizing the one or more loss functions, a second loss indicating a second difference between the intended use of the AI system and the ground-truth intended use. The process 900 can also include modifying parameters of the one or more digital content analysis models or one or more neural networks that determine the intended use of the AI system according to the one or more losses.

In some aspects, the process 900 includes an act for intercepting one or more queries from a client device to the AI system. In some aspects, the act is implemented using one or more examples described above with respect to FIGS. 2-3. The process 900 can also include an act for determining, utilizing one or more digital content analysis models, an intent of the one or more queries to the AI system based on digital content in the one or more queries. In some aspects, the act is implemented using one or more examples described above with respect to FIGS. 2-3. The process 900 can also include determining an intended use of the AI system from documentation associated with the AI system and accessed from the first computing system. In some aspects, the act is implemented using one or more examples described above with respect to FIGS. 2 and 4. The process 900 can further include generating a similarity score representing a similarity of the intent of the one or more queries and the intended use of the AI system. In some aspects, the act is implemented using one or more examples described above with respect to FIGS. 2 and 5. Additionally, the process 900 can include, in response to a comparison between the similarity score and a similarity threshold, executing computing instructions to: enable processing of the one or more queries by the AI system by submitting the one or more queries to the first computing system; or block processing of the one or more queries by the AI system by preventing the one or more queries from passing to the first computing system. In some aspects, the act is implemented using one or more examples described above with respect to FIGS. 2 and 5.

The process 900 can also include an act for intercepting the one or more queries from the client device to the AI system by routing data input by multiple client devices comprising the client device via an application interface associated with the AI system to the second computing system.

The process 900 can include an act for determining the intent of the one or more queries by: determining one or more text phrases form the one or more queries; and determining the intent of the one or more queries by determining the intent from the one or more text phrases utilizing a text processing neural network.

The process 900 can include an act for determining the intended use of the AI system by: determining one or more digital documents comprising information associated with one or more of an architecture, training data, hyperparameters, validation data, evaluation data, input data, or output data of one or more machine-learning models of the AI system; and determining the intended use of the AI system by processing the one or more digital documents utilizing a text processing neural network.

Additionally, the process 900 can include an act for determining the intended use of the AI system by: determining one or more digital documents comprising data requirements of a system requirements framework associated with the AI system; and determining the intended use of the AI system by processing the one or more digital documents utilizing a text processing neural network.

The process 900 can also include an act for executing computing instructions to enable processing of the one or more queries by the AI system by: determining that the similarity score meets the similarity threshold indicating that the intent of the one or more queries is within the similarity threshold of the intended use of the AI system; and providing the one or more queries to the AI system at the first computing system.

The process 900 can further include an act for enabling processing of the one or more queries by the AI system by: determining that the similarity score does not meet the similarity threshold indicating that the intent of the one or more queries is not within the similarity threshold of the intended use of the AI system; and preventing the AI system at the first computing system from receiving the one or more queries.

In some aspects, the process 900 includes an act for providing a notification to the client device indicating that the one or more queries have not been provided to the AI system with an indication that the intent of the one or more queries does not align with the intended use of the AI system.

In various aspects, the process 900 includes an act for intercepting one or more queries from a client device to an AI system. In some aspects, the act is implemented using one or more examples described above with respect to FIGS. 2-3. The process 900 also includes an act for determining, utilizing one or more digital content analysis models, an intent of the one or more queries to an AI system based on digital content in the one or more queries. In some aspects, the act is implemented using one or more examples described above with respect to FIGS. 2-3. The process 900 also includes an act for determining, utilizing the one or more digital content analysis models, an intended use of the AI system from documentation associated with the AI system. In some aspects, the act is implemented using one or more examples described above with respect to FIGS. 2 and 4. Additionally, the process 900 includes an act for generating a similarity score representing a similarity of the intent of the one or more queries and the intended use of the AI system. In some aspects, the act is implemented using one or more examples described above with respect to FIGS. 2 and 5. The process 900 further includes an act for, in response to a comparison between the similarity score and a similarity threshold, executing, by the one or more hardware processors, computing instructions to enable or block processing of the one or more queries by the AI system. In some aspects, the act is implemented using one or more examples described above with respect to FIGS. 2 and 5.

In some aspects, the process 900 includes an act for determining that the intent of the one or more queries does not match the intended use of the AI system in response determining that the similarity score does not meet the similarity threshold. The process 900 also includes an act for executing the computing instructions to block processing of the one or more queries by the AI system by preventing the one or more queries from being provided to a computing system implementing the AI system.

The process 900 can also include an act for determining that the intent of the one or more queries matches the intended use of the AI system in response to determining that the similarity score meets the similarity threshold. The process 900 can further include an act for executing the computing instructions to enable processing of the one or more queries by the AI system by providing the one or more queries to a computing system implementing the AI system.

Aspects described in the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. One or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
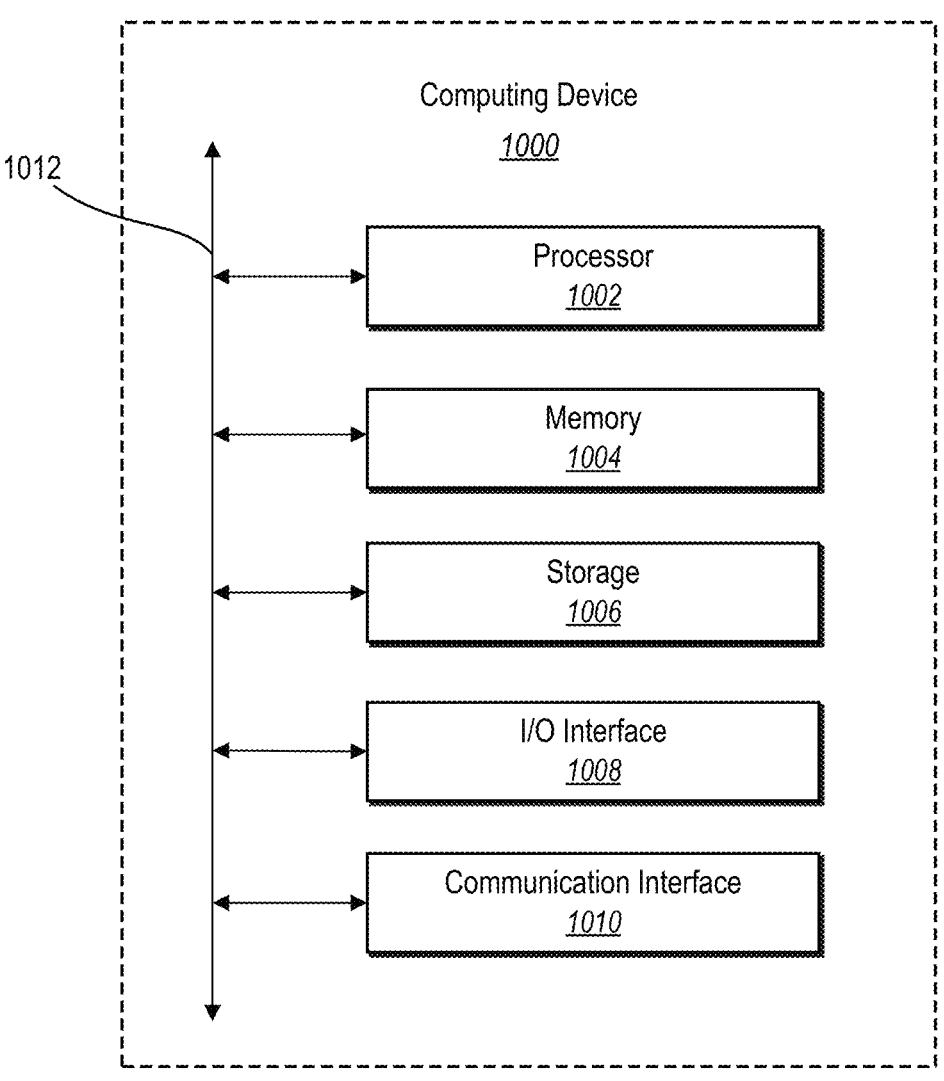
FIG. 10 illustrates an example of a computing device in accordance with some aspects.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain aspects, the computing device 1000 can include fewer or more components than those shown in FIG. 10. Components of the computing device 1000 shown in FIG. 10 will now be described in additional detail.

In some aspects, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable multiple computing devices connected by a particular infrastructure to communicate with each other to perform some aspects of the processes described herein. To illustrate, the digital content campaign management process can allow multiple devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
determining, by one or more hardware processors utilizing one or more digital content analysis models, an intent of one or more queries to an artificial intelligence system based on digital content in the one or more queries;
determining, by the one or more hardware processors, an intended use of the artificial intelligence system from documentation associated with the artificial intelligence system;
generating, by the one or more hardware processors, a similarity score by comparing the intent of the one or more queries to the intended use of the artificial intelligence system; and
in response to a comparison between the similarity score and a similarity threshold, executing, by the one or more hardware processors, computing instructions to:
enable processing of the one or more queries by the artificial intelligence system; or
block processing of the one or more queries by the artificial intelligence system.

2. The computer-implemented method of claim 1, wherein determining the intent of the one or more queries comprises:
intercepting the one or more queries from a query device to the artificial intelligence system;

determining one or more text strings or one or more digital images from the one or more queries; and
determining the intent of the one or more queries by utilizing a text processing neural network or one or more image processing neural networks to perform a semantic analysis on the one or more text strings or the one or more digital images.

3. The computer-implemented method of claim 2, wherein enabling processing of the one or more queries by the artificial intelligence system comprises:
determining that the similarity score of the one or more queries meets the similarity threshold; and
providing the one or more queries to one or more computing devices implementing the artificial intelligence system.

4. The computer-implemented method of claim 2, wherein blocking processing of the one or more queries by the artificial intelligence system comprises:
determining that the similarity score of the one or more queries does not meet the similarity threshold; and
preventing one or more computing devices implementing the artificial intelligence system from receiving the one or more queries.

5. The computer-implemented method of claim 1, wherein determining the intended use of the artificial intelligence system comprises:
accessing the documentation associated with the artificial intelligence system from a computing system implementing the artificial intelligence system; and
determining the intended use of the artificial intelligence system from the documentation utilizing a text processing neural network.

6. The computer-implemented method of claim 5, wherein determining the intended use of the artificial intelligence system comprises:
accessing, from a third-party computing system, a set of requirements for the artificial intelligence system from a system requirements framework associated with the artificial intelligence system; and
determining the intended use of the artificial intelligence system from the set of requirements and the documentation utilizing the text processing neural network.

7. The computer-implemented method of claim 1, wherein determining the intent of the one or more queries comprises determining the one or more queries from a first text input previously entered into a chat interface with the artificial intelligence system and a second text input being entered into the chat interface with the artificial intelligence system.

8. The computer-implemented method of claim 1, further comprising:
determining a ground-truth intent for the one or more queries and a ground-truth intended use of the artificial intelligence system;
determining one or more losses based on the intent of the one or more queries, the intended use of the artificial intelligence system, the ground-truth intent, and the ground-truth intended use; and
modifying parameters of the one or more digital content analysis models or one or more neural networks that determine the intended use of the artificial intelligence system according to the one or more losses.

9. The computer-implemented method of claim 8, wherein determining the one or more losses comprises:
determining, utilizing one or more loss functions, a first loss indicating a first difference between the intent of the one or more queries and the ground-truth intent; and determining, utilizing the one or more loss functions, a second loss indicating a second difference between the intended use of the artificial intelligence system and the ground-truth intended use.

10. A system comprising:

a first computing system implementing an artificial intelligence system; and a second computing system comprising one or more hardware processors to:

intercept one or more queries from a client device to the artificial intelligence system;

determine, utilizing one or more digital content analysis models, an intent of the one or more queries to the artificial intelligence system based on digital content in the one or more queries;

determine an intended use of the artificial intelligence system from documentation associated with the artificial intelligence system and accessed from the first computing system;

generate a similarity score representing a similarity of the intent of the one or more queries and the intended use of the artificial intelligence system; and in response to a comparison between the similarity score and a similarity threshold, execute computing instructions to:

enable processing of the one or more queries by the artificial intelligence system by submitting the one or more queries to the first computing system; or block processing of the one or more queries by the artificial intelligence system by preventing the one or more queries from passing to the first computing system.

11. The system of claim 10, wherein the one or more hardware processors are further configured to intercept the one or more queries from the client device to the artificial intelligence system by routing data input by a plurality of client devices comprising the client device via an application interface associated with the artificial intelligence system to the second computing system.

12. The system of claim 10, wherein the one or more hardware processors are further configured to determine the intent of the one or more queries by:

determining one or more text phrases form the one or more queries; and determining the intent of the one or more queries by determining the intent from the one or more text phrases utilizing a text processing neural network.

13. The system of claim 10, wherein the one or more hardware processors are further configured to determine the intended use of the artificial intelligence system by:

determining one or more digital documents comprising information associated with one or more of an architecture, training data, hyperparameters, validation data, evaluation data, input data, or output data of one or more machine-learning models of the artificial intelligence system; and determining the intended use of the artificial intelligence system by processing the one or more digital documents utilizing a text processing neural network.

14. The system of claim 10, wherein the one or more hardware processors are further configured to determine the intended use of the artificial intelligence system by:

determining one or more digital documents comprising data requirements of a system requirements framework associated with the artificial intelligence system; and determining the intended use of the artificial intelligence system by processing the one or more digital documents utilizing a text processing neural network.

15. The system of claim 10, wherein the one or more hardware processors are further configured to execute the computing instructions to enable processing of the one or more queries by the artificial intelligence system by:

determining that the similarity score meets the similarity threshold indicating that the intent of the one or more queries is within the similarity threshold of the intended use of the artificial intelligence system; and providing the one or more queries to the artificial intelligence system at the first computing system.

16. The system of claim 10, wherein the one or more hardware processors are further configured to execute the computing instructions to enable processing of the one or more queries by the artificial intelligence system by:

determining that the similarity score does not meet the similarity threshold indicating that the intent of the one or more queries is not within the similarity threshold of the intended use of the artificial intelligence system; and preventing the artificial intelligence system at the first computing system from receiving the one or more queries.

17. The system of claim 16, wherein the one or more hardware processors are further configured to provide a notification to the client device indicating that the one or more queries have not been provided to the artificial intelligence system with an indication that the intent of the one or more queries does not align with the intended use of the artificial intelligence system.

18. A non-transitory computer readable medium comprising instructions that, when executed by computing hardware, cause the computing hardware to:

intercept one or more queries from a client device to an artificial intelligence system;

determine, utilizing one or more digital content analysis models, an intent of the one or more queries to the artificial intelligence system based on digital content in the one or more queries;

determine, utilizing the one or more digital content analysis models, an intended use of the artificial intelligence system from documentation associated with the artificial intelligence system;

generate a similarity score representing a similarity of the intent of the one or more queries and the intended use of the artificial intelligence system; and in response to a comparison between the similarity score and a similarity threshold, execute, by the one or more hardware processors, computing instructions to enable or block processing of the one or more queries by the artificial intelligence system.

19. The non-transitory computer readable medium of claim 18, wherein the instructions that, when executed by the computing hardware, further cause the computing hardware to:

determine that the intent of the one or more queries does not match the intended use of the artificial intelligence system in response determining that the similarity score does not meet the similarity threshold; and execute the computing instructions to block processing of the one or more queries by the artificial intelligence system by preventing the one or more queries from being provided to a computing system implementing the artificial intelligence system.

20. The non-transitory computer readable medium of claim 18, wherein the instructions that, when executed by the computing hardware, further cause the computing hardware to:

determine that the intent of the one or more queries matches the intended use of the artificial intelligence system in response to determining that the similarity score meets the similarity threshold; and execute the computing instructions to enable processing of the one or more queries by the artificial intelligence system by providing the one or more queries to a computing system implementing the artificial intelligence system.

\* \* \* \* \*